J. MARGO.
TRAP.
APPLICATION FILED APR. 15, 1916.

1,294,293.

Patented Feb. 11, 1919.

Witness
OBealle.

Inventor
J. Margo.
By
Attorney

UNITED STATES PATENT OFFICE.

JOHN MARGO, OF CHISHOLM, MINNESOTA, ASSIGNOR OF ONE-HALF TO MARY HUDAK, OF CHISHOLM, MINNESOTA.

TRAP.

1,294,293.      Specification of Letters Patent.      Patented Feb. 11, 1919.

Application filed April 15, 1916. Serial No. 91,373.

*To all whom it may concern:*

Be it known that I, JOHN MARGO, a subject of the Emperor of Austria-Hungary, residing at Chisholm, in the county of St. Louis and State of Minnesota, have invented certain new and useful Improvements in Traps; and I do hereby declare the following to be a full, clear, and exact description of the invention, such as will enable others skilled in the art to which it appertains to make and use the same.

This invention relates to new and useful improvements in traps and the principal object of the invention is to provide a trap which will trap animals without injuring the same.

Another object of the invention is to provide a trap which is tripped automatically upon the passage of the animal through the same.

A still further object of the invention is to provide a novel means for holding the trap in its open position which is constructed in such a manner as to be readily tripped and which may be readily closed.

With these and other objects in view, the invention consists in the novel combination and arrangement of parts which will be fully set forth in the following specification and accompanying drawing, in which:—

Figure 1:
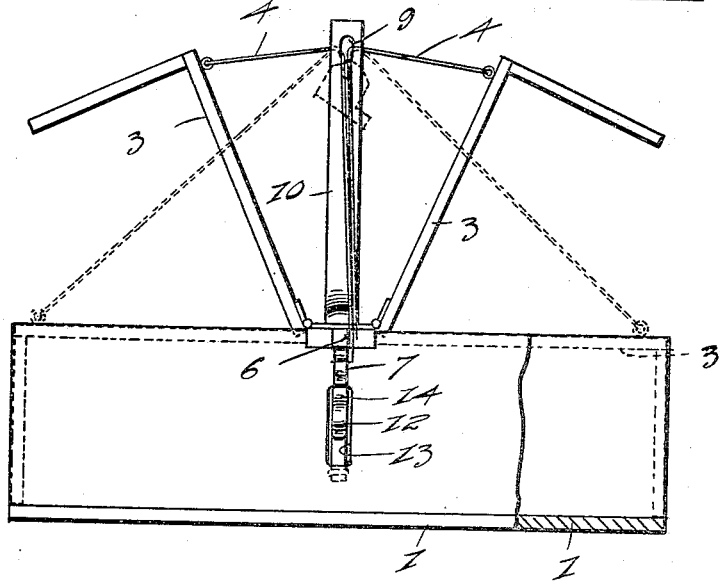
Figure 1 is a fragmentary side elevation of the trap illustrating the same in an operative position.

Referring to the drawing 1 designates the body of the trap consisting of a bottom and side walls, the upper edges of which are connected at their central portion by a suitable transverse strip 2 to which the covers 3 are hinged. These covers 3 carry suitable end walls as illustrated in the drawing and have secured adjacent their outer ends suitable eyes to which the flexible members 4 are connected. The opposite terminals of these flexible members are attached to the trip mechanism as will be more fully hereinafter described. Formed at one end of the strip 2 is an extension 5 forming a shoulder 6 against which a catch which will be more fully hereinafter described bears.

Figure 2:
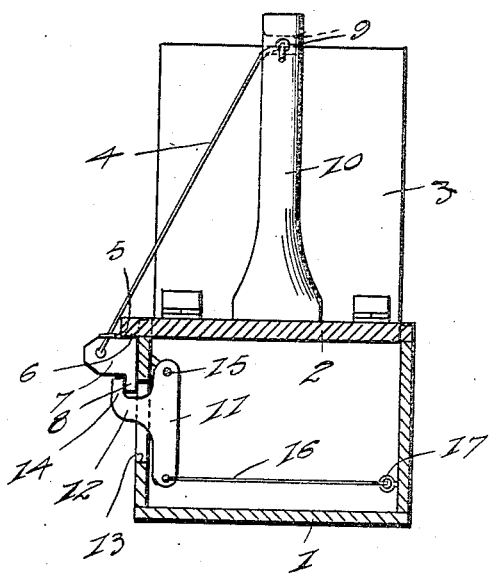
Fig. 2 is a transverse sectional view through the device.
Figure 3:
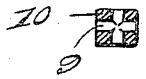
Fig. 3 is a horizontal sectional view through the upper end of the standard.

The catch above referred to consists of a body 7 having the extension 8 formed on one side and projecting oppositely therefrom while the body is provided with an opening through which the flexible members 4 are connected as clearly illustrated in Fig. 2. These flexible members pass upwardly and through suitable openings 9 in the upper end of the post 10 which is secured centrally of the strip 2 and it will thus be seen that when the catch is in a position shown in Fig. 2 the covers 3 will be elevated.

In order to hold the catch in the position illustrated a suitable latch 11 is provided having formed thereon the arm 12 which is operable through a slot 13 in one of the side walls of the body 1 of the trap and carries at its outer end the finger 14 which engages the outer side of the extension 8 as clearly shown in the drawing. The upper end of the latch is pivoted as at 15 to the inner side of the bottom wall of the device and the lower end projects downwardly as shown and has connected thereto a suitable flexible member 16 the opposite terminal of which is connected to the eyes 17 secured to the opposite wall of the trap.

It will be apparent from the foregoing that in use the catch is placed in the position shown in Fig. 2 so that the finger 14 engages the extension 8 and when in this position it will be apparent that the covers will be elevated. Upon the passage of an animal through the trap it will be apparent that it will engage the flexible members 16 exerting pull on the same thereby causing the latch 11 to swing on its pivot 15 and pull the finger 14 out of engagement with the extension 8 thereby freeing the catch 7 and releasing the tension on the flexible members 4 thus permitting the covers to fall.

What is claimed is:—

A trap comprising a body having a vertical slot in one of its side walls, said slot terminating short of the upper edge of said wall, a lug extending horizontally beyond said wall above the upper end of and in alinement with said slot, a post, a hinged cover, a flexible member connected at one end to said cover and engaging said post, a catch connected to the other end of said flexible member and adapted to be held in contact with the under side of said lug and with said wall at a point above the upper end of said slot to retain the cover in opened position, a lug extending downwardly from said catch below the upper end of said slot, a latch pivoted to the inner side of said wall at a point above the upper end of said slot and extending to a point below the lower end of said slot, an outwardly and upwardly directed finger carried by said latch and extending through said slot and engaging the lug of said catch, and a trip member connected to the lower end of said latch and to the body.

In testimony whereof I affix my signature in presence of two witnesses.

JOHN MARGO.

Witnesses:
EDWARD FREEMAN,
PHIL L. O'TOOLE.